United States Patent [19]

Inayama

[11] 3,899,613

[45] Aug. 12, 1975

[54] STATIC CHARGE PREVENTING METHOD FOR ACETYLCELLULOSE MOLDINGS

[75] Inventor: Takayuki Inayama, Kanagawa, Japan

[73] Assignee: Fuji Photo Film Co., Ltd., Kanagawa, Japan

[22] Filed: Nov. 5, 1973

[21] Appl. No.: 413,064

[30] Foreign Application Priority Data

Nov. 4, 1972 Japan ............................ 47-110504

[52] U.S. Cl. ............ 427/133; 106/38.22; 427/390; 427/392

[51] Int. Cl.[2] ...................... C08J 1/38; C04B 35/68

[58] Field of Search ........ 8/129, 130; 106/177, 180, 106/183, 194, 181, 38.2, 38.22, 38.27; 117/144, 144.5

[56] References Cited

UNITED STATES PATENTS

| | | | |
|---|---|---|---|
| 2,805,171 | 9/1957 | Williams | 106/181 X |
| 3,401,047 | 9/1968 | Garden et al. | 106/181 X |
| 3,808,038 | 4/1974 | Veno et al. | 117/144 |

FOREIGN PATENTS OR APPLICATIONS

| | | | |
|---|---|---|---|
| 528,126 | 7/1956 | Canada | 106/194 |

*Primary Examiner*—Michael R. Lusignan

*Attorney, Agent, or Firm*—Sughrue, Rothwell, Mion, Zinn & Macpeak

[57] ABSTRACT

A method of preventing static charge accumulation on acetylcellulose moldings comprising applying a perchlorate and a plasticizer to acetylcellulose moldings.

12 Claims, No Drawings

STATIC CHARGE PREVENTING METHOD FOR ACETYLCELLULOSE MOLDINGS

BACKGROUND OF THE INVENTION

1. Field of the Invention

The present invention relates to a method for preventing static charges on acetylcellulose moldings and, in more detail, to a method for preventing static charges on acetylcellulose moldings which comprises applying a perchlorate and a plasticizer to acetylcellulose moldings.

2. Description of the Prior Art

Acetylcellulose resins have disadvantages in that electric charges accumulate and dust collection results in production or on use of the moldings and the danger of electric shock can occur while working, because the acetylcellulose resins have a high electric insulating property. Further, these difficulties influence to a great extent the use of the moldings since they are used widely as industrial materials or in daily life. These difficulties are caused by static electricity which is generated by rubbing the resin with other substances. Thus, many kinds of difficulties originate from such static electricity. Accordingly, many methods for preventing static charge in which antistatic agents are used have been studied in order to prevent such troubles.

At present, as static charge preventing methods exhibiting durable antistatic effects, there is a method which comprises combining antistatic agents into resins. Recently, such method has been actively studied.

As antistatic agents used in such a method, there are anionic, cationic, nonionic and ampholytic surface active agents. However, these surface active agents have not yet been used satisfactorily because of their properties such as compatibility to resins, blooming, coloration and lack of heat resistance, etc. Particularly, in using these antistatic agents in acetylcellulose moldings, the amount of the antistatic agents which can be used in the resins is generally limited to a very narrow range, such as 5 to 6 percent (by weight), because of blooming or coloration, and consequently a sufficient antistatic effect can not be obtained. In such a case, the antistatic effect is hardly obtained when the amount of the antistatic agents is less than the above described range.

SUMMARY OF THE INVENTION

An object of the present invention is to provide a method for preventing static charges in acetylcellulose moldings by using an antistatic agent, in which the range of the amount used can be enlarged and a sufficient antistatic effect can be obtained. The method of preventing static charge for acetylcellulose moldings of the invention comprises applying a composition of a perchlorate and a plasticizer to acetylcellulose moldings.

DETAILED DESCRIPTION OF THE INVENTION

In the following, the present invention will be explained in greater detail.

Suitable perchlorates which can be used are alkali metal perchlorates, alkaline earth metal perchlorates ammonium perchlorate or other metal perchlorates (such as Li, Na, K, Ca, Mg, Ba, $NH_4$, Al, Zn, Mn, Cd, Cr, Co, Te, Fe, Cu, Ni etc. perchlorates) of these, a suitable perchlorate can be chosen by considering the solubility in the solvent used, and compatibility to acetylcellulose.

As specific perchlorates which can be used in the present invention, examples are lithium perchlorate, sodium perchlorate, barium perchlorate, calcium perchlorate, magnesium perchlorate and potassium perchlorate. However, although magnesium perchlorate can be used in the present invention, it is not as desirable for use as the other perchlorates in the treatment of raw materials in production of moldings or on handling of the moldings, because it is poisonous. It is also necessary that the perchlorate have good compatibility with the acetylcellulose resin. Where the acetylcellulose moldings are molded from a solution of an acetylcellulose resin, the solubility of the perchlorate employed in an organic solvent must be considered. Therefore, potassium perchlorate is not preferable where acetylcellulose moldings are produced by such method, because it is insoluble in organic solvents. Of these perchlorates, set forth above the most convenient for handling is lithium perchlorate.

The term "plasticizer" as used in the present invention means liquids having a high boiling point, e.g., above 150°C or higher, which are technically known as plasticizers in the field of plastics. Examples of such plasticizers include dicarboxylic acid esters of, e.g., aliphatic and aromatic carboxylic acids, for example, adipic acid derivatives such as diethyl adipate, dibutyl adipate, dihexyl adipate and dioctyl adipate, azelaic acid derivatives such as di-2-ethyl-hexyl azelate and di-2-ethylbutyl azelate, citric acid derivatives such as triethyl citrate, acetyl triethyl citrate, acetyl-tri-n-butyl citrate and acetyl trihexyl citrate, phthalic acid derivatives such as dimethyl phthalate, diethyl phthalate, di-n-propyl phthalate, dibutyl phthalate, diamyl phthalate, dimethoxyethyl phthalate and dioctyl phthalate, polyol esters, e.g., of glycols and glycerin, for example, glycerine derivatives such as glycerol monoacetate, glycerol diacetate, glycerol triacetate and glycerol tributyrate, glycol derivatives such as diethyleneglycoldipropionate, triethyleneglycol diacetate, triethyleneglycol dipropionate, methylphthalylethyl glycolate, ethylphthalylethyl glycolate butylphthalylbutyl glycolate and ethylphthalylbutyl glycolate, and phosphoric acid esters, e.g., the alkyl esters or aryl esters, for example, phosphoric acid derivatives such as triethyl phosphate, tributyl phosphate, tricresyl phosphate and triphenyl phosphate, and other plasticizers having a compatibility with acetylcellulose resins.

The acetylcellulose moldings comprise mainly of acetylcellulose, which can be formed into films, sheets and other desired shapes by molding. Examples of acetylcellulose are diacetylcellulose, triacetylcellulose, acetylbutyroylcellulose and acetylproionylcellulose.

According to the present invention, a mixture of the perchlorate and the plasticizer is applied to the acetyl cellulose moldings. As suitable embodiments for the application of the composition of the invention, two methods can be used. One of the methods comprises adding the mixture to the resin raw materials at the time of molding to produce acetylcellulose moldings containing the mixture and the other of the methods comprises contacting the surfaces of the molded acetyl cellulose moldings with a solution of the above described mixture. Means for the contacting include dipping, applying and spraying.

In the first method, the techniques of blending additives with plastics generally used in the plastics industry can be utilized without modification. For instance, moldings having the desired shape such as a sheet, a film and a rod can be produced by mixing a perchlorate and a plasticizer with an acetylcellulose powder, feeding the resulting homogeneous composition to an extruder, heat blending the composition, and molding at temperatures of 150° – 270°C by extrusion, or producing pellets by extrusion and then molding at similar temperatures by introducing the pellets into an extruder. Of course, the desired moldings can be produced from these pellets using another plastic molding apparatus such as an injection molding machine, a vacuum molding machine, a blow molding machine and a compression molding machine, etc. These procedures are well known as disclosed in, for example, Ishii Plastic Zairyo Koza Vol. VII, pp. 151–167, Nikkan Kogyo Shinbun 1961, Tokyo.

In another embodiment of the first method, the acetylcellulose resin and the composition of the present invention are dissolved in an organic solvent to prepare a solution which is then used in a flow-coating method, a spray-molding method and a slush molding method, etc. In this case, the acetylcellulose resin, the perchlorate and the plasticizer are dissolved in a solvent such as a ketone, ester, halogenatedhydrocarbon, acid, amide, ether or alcohol. As the solvent, mixtures of a solvent for acetylcellulose resins and plasticizers such as acetone, cyclohexanone, ethyl acetate, chloroform, ethylene chlorohydrin, tetrachloroethane, methylene chloride, acetic acid, dimethylformamide, dioxane and methyl cellosolve etc. and a solvent for the perchlorates such as methanol, ethanol and acetone etc. can be used. The acetylcellulose is dissolved in this solvent mixture in an amount of about 10 to 20 percent by weight and then the perchlorate and the plasticizer are added thereto. The resulted solution is cast on a metal belt and dried to make a final molding.

In the present invention, the amount of the perchlorate added to the acetylcellulose resin is 2 to 15 percent (by weight) and preferably 5 to 10 percent (by weight) based on the weight of the resin, and the amount of the plasticizer is suitably from 5 to 20 percent (by weight), preferably 8 to 15 percent (by weight). If the amount of the perchlorate is below 2 percent (by weight) sufficient antistatic effects can not be obtained. On the other hand, an amount more than 15 percent of the perchlorate is not necessary except in special case because sufficient antistatic effect is obtained with an amount of up to 15 percent by weight or so. When an amount above 15 percent is used, the resin becomes cloudy. However, such cloudiness can be prevented if the amounts of the perchlorate and the plasticizer are selected so as to have a certain ratio. For example, if sodium perchlorate is added to the cellulose triacetate resin in the amount of 15 percent, cloudiness occurs. But if 20 percent by weight of glycerol triacetate as the plasticizer is used together, a transparent film can be formed. A preferred amount of the plasticizer is 5 to 20 percent by weight.

In the second coating method, the perchlorate and the plasticizer are dissolved in an organic solvent. Then this solution is applied to the resin moldings by dipping, spraying or coating, etc.

As described above in detail, according to the present invention, the surface electric resistivity of the moldings is remarkably decreased as compared with that of untreated moldings. Further, since transparent durable antistatic moldings which are not cloudy or sticky and which do not bloom can be produced, the present invention is very useful.

The present invention will be explained in greater detail by the following examples. Unless otherwise indicated, all parts and percents are by weight.

Evaluation of the antistatic effect of the samples in these examples is shown by the surface electric resistivity determined and calculated by the following method.

Determination:

A sample is placed between two brass electrodes having a length of 10 cm and separated from each other by a space of 0.14 cm. An electric voltage is applied to both electrodes using an insulation resistance tester ("MM-M" type insulation resistance tester, produced by Takeda Riken Kogyo Co., Ltd.). The value after the lapse of 1 minute is determined (the 1 minute value).

Calculation:

The surface electric resistivity (Ω) is calculated using the following equation $$\text{Surface Resistivity } (\Omega) = \text{Determinated Value } (\Omega) \times \frac{\text{Length of electrode (cm)}}{\text{Space between the electrodes (cm)}}$$

EXAMPLE 1

10 g of a cellulose triacetate resin, 90 g of a solvent mixture of methylene chloride: methanol = 92:8 (percent by weight) and an antistatic agent and a plasticizer as shown in Table 1 were mixed. The resulted solution was spread on a horizontal glass plate by flowing and dried. When the coated film dried sufficient so that it could be peeled from the glass plate, the film was set in a frame and dried for 1 hour in air at constant temperature of 110°C.

Table 1

| Sample No. | Perchlorate | Amount (% by weight) | Plasticizer | Amount (% by weight) | Surface Resistivity (Ω) | Appearance of Film |
|---|---|---|---|---|---|---|
| A – 1 | $LiClO_4.3H_2O$ | 5 | None | 0 | $5 \times 10^{11}$ | Colorless, transparent |
| A – 2 | " | 10 | None | 0 | $8 \times 10^{10}$ | " |
| A – 3 | " | 0 | Triacetin | 5 | above $1 \times 10^{14}$ | " |
| A – 4 | " | 0 | " | 10 | above $1 \times 10^{14}$ | " |

Table 1—Continued

| Sample No. | Perchlorate | Amount (% by weight) | Plasticizer | Amount (% by weight) | Surface Resistivity (Ω) | Appearance of Film |
|---|---|---|---|---|---|---|
| A — 5 | " | 0 | " | 20 | above $1 \times 10^{14}$ | " |
| A'— 1 | " | 5 | " | 5 | $4 \times 10^{11}$ | " |
| A'— 2 | " | 5 | " | 10 | $2 \times 10^{11}$ | " |
| A'— 3 | " | 5 | " | 20 | $5 \times 10^{10}$ | " |
| A'— 4 | " | 10 | " | 20 | $5 \times 10^{7}$ | " |
| B — 1 | " | 10 | None | 0 | $2 \times 10^{10}$ | " |
| B — 2 | " | 0 | BPEG | 20 | above $1 \times 10^{14}$ | " |
| B'— 1 | " | 10 | " | 20 | $9 \times 10^{8}$ | " |
| C — 1 | $NaClO_4$ | 10 | None | 0 | $3 \times 10^{10}$ | " |
| C — 2 | " | 0 | Triacetin | 20 | above $1 \times 10^{14}$ | " |
| C'— 1 | " | 10 | " | 20 | $7 \times 10^{8}$ | " |
| D — 1 | " | 0 | BPEG | 20 | above $1 \times 10^{14}$ | " |
| D'— 1 | " | 10 | " | 20 | $9 \times 10^{8}$ | " |
| E — 1 | " | 15 | None | 0 | $9 \times 10^{9}$ | Slightly cloudy |
| E'— 1 | " | 15 | Triacetin | 20 | $6 \times 10^{8}$ | Colorless, transparent |
| F — 1 | $BaClO_4$ | 10 | None | 0 | $1 \times 10^{12}$ | " |
| F — 2 | " | 0 | Triacetin | 20 | above $1 \times 10^{14}$ | " |
| F'— 1 | " | 10 | " | 20 | $1 \times 10^{10}$ | " |
| G — 1 | " | 0 | BPEG | 20 | above $1 \times 10^{14}$ | " |
| G'— 1 | " | 10 | " | 20 | $7 \times 10^{10}$ | " |

Note:
(1) Samples designated "'" are those of this invention and the others are those for comparison.
(2) In the plasticizer column, "Triacetin" is glycerol triacetate, and "BPEG" is butylphthalylethyl glycolate.

From the results shown in Table 1, it can be seen that the surface electric resistivity of the samples of this invention is remarkably and sufficiently lower than that of comparison examples, which demonstrates the effect of this invention of using the perchlorate together with the plasticizer.

EXAMPLE 2

Antistatic coating solutions having the following compositions were applied to cellulose triacetate sheets and dried for 10 minutes in an atmosphere at 70°C.

Table 2

| Composition of Antistatic Coating Solution | | | Surface resistivity (Ω) |
|---|---|---|---|
| Sample According to This Invention: | | | |
| Lithium perchlorate | 0.5 | g | |
| Plasticizer: triacetin | 0.5 | g | |
| Methanol | 80 | cc | |
| Acetone | 20 | cc | $9 \times 10^{11}$ |
| Comparison Sample 1: | | | |
| Lithium perchlorate | 0.5 | g | |
| Methanol | 80 | cc | |
| Acetone | 20 | cc | $3 \times 10^{12}$ |
| Comparison Sample 2: | | | |
| Methanol | 80 | cc | |
| Acetone | 20 | cc | above $1 \times 10^{14}$ |

From the results shown in Table 2, it can be seen that the surface electric resistivity remarkably decreases by use of the antistatic composition of this invention as compared with the case of using the perchlorate alone.

While the invention has been described in detail and with reference to specific embodiments thereof, it will be apparent to one skilled in the art that various changes and modifications can be made therein without departing from the spirit and scope thereof.

What is claimed is:

1. A method of preventing static charge accumulation on acetylcellulose resin moldings comprising applying a perchlorate in an amount of from 2–15 percent by weight based on the weight of said acetylcellulose resin and a plasticizer in an amount of 5–20 percent by weight based on the weight of said acetylcellulose resin to acetylcellulose moldings, said perchlorate and plasticizer being applied in a sufficient amount in combination to impart anti-static properties to said acetylcellulose moldings.

2. The method of claim 1, wherein said plasticizer is an organic liquid having a boiling point of 150°C or higher.

3. The method of claim 2, wherein said plasticizer is a dicarboxylic acid ester, a polyol ester or a phosphoric acid ester.

4. The method of claim 3, wherein said plasticizer is an adipic acid derivative, an azelaic acid derivative, a citric acid derivative, a phthalic acid derivative, a glycerine derivative, a glycol derivative, or a phosphoric acid derivative.

5. The method of claim 4, wherein said adipic acid derivative is diethyl adipate, dibutyl adipate, dihexyl adipate or dioctyl adipate, wherein said azelaic acid derivative is di-2-ethyl-hexyl azelate or di-2-ethylbutyl azelate, wherein said citric acid derivative is triethyl citrate, acetyl triethyl citrate, acetyl-tri-n-butyl citrate or acetyl trihexyl citrate, wherein said phthalic acid derivative is dimethyl phthalate, diethyl phthalate, di-n-propyl phthalate, dibutyl phthalate, diamyl phthalate, dimethoxyethyl phthalate or dioctyl phthalate, wherein said glycerine derivative is glycerol monoacetate, glycerol diacetate, glycerol triacetate or glycerol tributyrate, wherein said glycol derivative is diethyleneglycoldipropionate, triethyleneglycol diacetate, triethyleneglycol dipropionate, methylphthalylethyl glycolate, ethylphthalylethyl glycolate, butylphthalylbutyl glycolate or ethylphthalylbutyl glycolate, and wherein said phosphoric acid derivative is triethyl phosphate, tributyl phosphate, tricresyl phosphate or triphenyl phosphate.

6. The method of claim 1, wherein said applying is by incorporating said perchlorate and said plasticizer into said acetylcellulose before formation of said molding.

7. The method of claim 1, wherein said applying is by contacting a surface of said acetylcellulose molding after formation with a solution of said perchlorate and said plasticizer.

8. The method of claim 1, wherein said perchlorate is an alkali metal perchlorate, an alkaline earth metal perchlorate, ammonium perchlorate or a metal perchlorate.

9. The method of claim 8, wherein said alkali metal is lithium, sodium, or potassium, wherein said alkaline earth metal is calcium, magnesium, or barium and wherein said metal is aluminium, zinc, manganese, cadmium, chromium, tellurium, cobalt, iron, copper or nickel.

10. The method of claim 9, wherein said perchlorate is lithium perchlorate, potassium perchlorate, sodium perchlorate, barium perchlorate, calcium perchlorate or magnesium perchlorate.

11. An acetyl cellulose molding produced by the method of claim 1.

12. The acetyl cellulose molding of claim 11, wherein said acetyl cellulose is diacetylcellulose, triacetylcellulose, acetylbutrylcellulose or acetylpropionylcellulose.

* * * * *